(12) United States Patent
Drew et al.

(10) Patent No.: US 9,635,766 B2
(45) Date of Patent: Apr. 25, 2017

(54) SLIDABLE DISPLAY HOUSING

(75) Inventors: Paul L. Drew, The Woodlands, TX (US); Tony O. Anuez, Houston, TX (US); Peter W. Austin, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/347,335

(22) PCT Filed: Sep. 28, 2011

(86) PCT No.: PCT/US2011/053709
§ 371 (c)(1),
(2), (4) Date: Mar. 26, 2014

(87) PCT Pub. No.: WO2013/048392
PCT Pub. Date: Apr. 4, 2013

(65) Prior Publication Data
US 2014/0236744 A1  Aug. 21, 2014

(51) Int. Cl.
| | |
|---|---|
| *G06Q 20/00* | (2012.01) |
| *H05K 5/00* | (2006.01) |
| *F16M 11/04* | (2006.01) |
| *F16M 11/20* | (2006.01) |
| *G06Q 20/20* | (2012.01) |
| *A47B 97/04* | (2006.01) |

(52) U.S. Cl.
CPC ......... *H05K 5/0017* (2013.01); *F16M 11/045* (2013.01); *F16M 11/2014* (2013.01); *F16M 11/2021* (2013.01); *G06Q 20/20* (2013.01); *F16M 2200/028* (2013.01); *F16M 2200/065* (2013.01)

(58) Field of Classification Search
CPC .... G06Q 20/204; G06Q 20/20; G06Q 20/202; G06Q 20/40; G06Q 20/10
USPC .......................................................... 705/17
See application file for complete search history.

(56) References Cited

U.S. PATENT DOCUMENTS

| | | | |
|---|---|---|---|
| 6,464,195 B1 * | 10/2002 | Hildebrandt | G06F 1/1616 248/460 |
| 2002/0003571 A1 * | 1/2002 | Schofield | B60C 23/00 348/148 |
| 2005/0041379 A1 | 2/2005 | Jang | |

(Continued)

FOREIGN PATENT DOCUMENTS

| | | |
|---|---|---|
| CN | 1829427 | 9/2006 |
| CN | 201120070496.1 | 9/2011 |

(Continued)

OTHER PUBLICATIONS

Costco, "Simplicity 37"-65"Tilting TV Wall Mount," 2011, pp. 1-5.
(Continued)

*Primary Examiner* — Garcia Ade
(74) *Attorney, Agent, or Firm* — HP Patent Department

(57) ABSTRACT

A display system comprises a display housing and an attachment member. The attachment member attaches to and supports the display housing. Further, the display housing slides relative to the attachment member. In some embodiments, the system comprises multiple displays in which one display slides relative to an attachment hinge that supports such display.

20 Claims, 11 Drawing Sheets

(56) References Cited

U.S. PATENT DOCUMENTS

| | | | |
|---|---|---|---|
| 2005/0051693 A1 | 3/2005 | Chu | |
| 2006/0007644 A1* | 1/2006 | Huilgol | G06F 1/1616 361/679.07 |
| 2006/0109250 A1* | 5/2006 | Prichard | G06F 1/1624 345/168 |
| 2006/0123799 A1* | 6/2006 | Tateyama | H01L 35/06 62/3.7 |
| 2010/0157513 A1 | 6/2010 | Guo | |

FOREIGN PATENT DOCUMENTS

| | | |
|---|---|---|
| EP | 1803987 | 7/2007 |
| KR | 10-0180681 B1 | 4/1999 |
| KR | 10-2006-0123799 A | 12/2006 |
| WO | WO-2006036889 | 4/2006 |

OTHER PUBLICATIONS

International Search Report and Written Opinion, International Application No. PCT/US2011/053709, Date of Mailing: Mar. 26, 2012, pp. 1-6.
Posiflex, "Customer Pole Display," pp. 1-3.
Posiflex, "Pole Display," 1 page.

\* cited by examiner

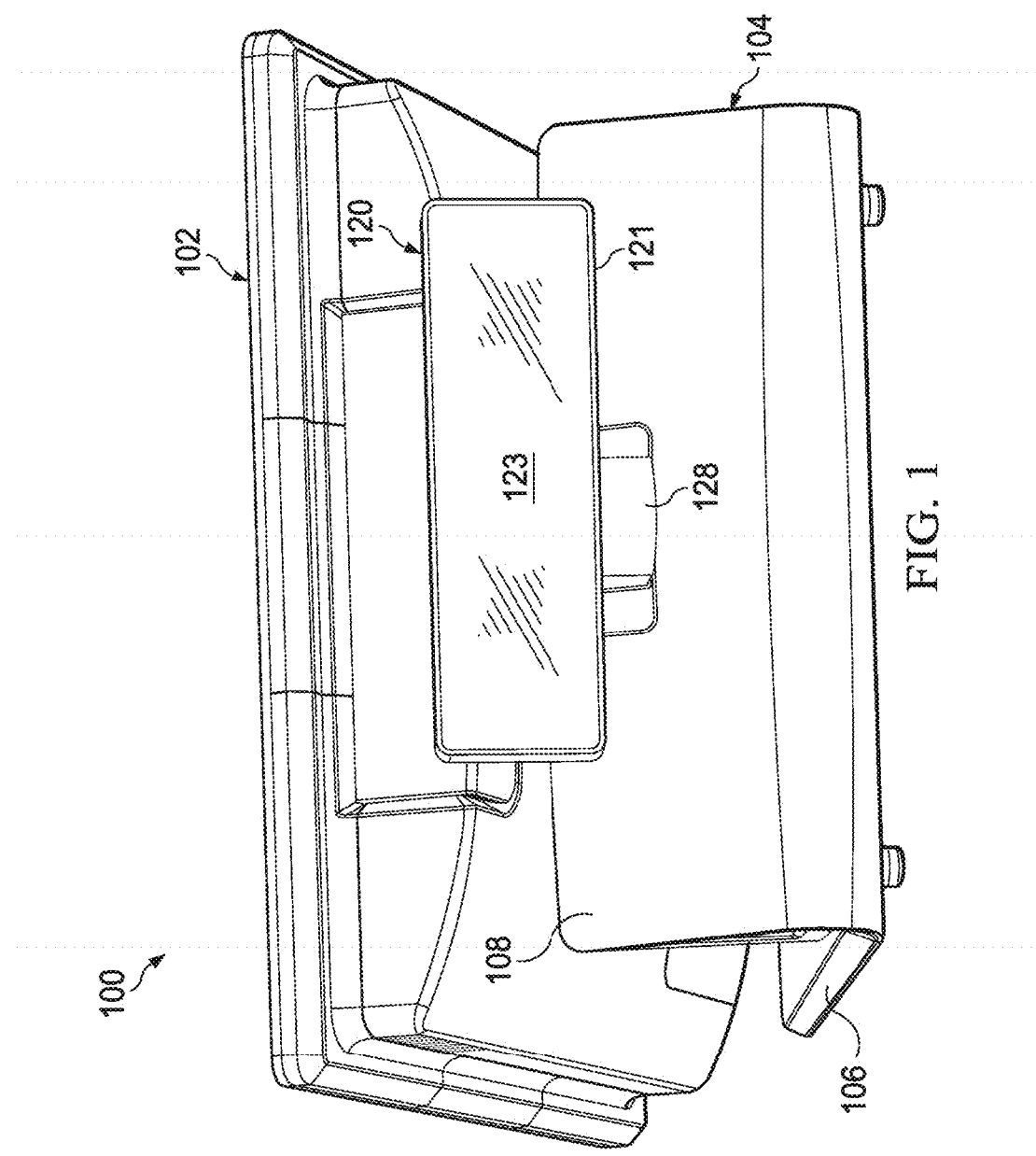

SLIDABLE DISPLAY HOUSING

CROSS-REFERENCE TO RELATED APPLICATION

This application is a national stage application under 35 U.S.C. §371 of PCT/US2011/053709, filed Sep. 28, 2011.

BACKGROUND

Some display support systems permit a display to be swiveled left and right for better viewing by a user. For example, a point-of-sale (POS) system includes a main display used by an operator and, typically, a smaller display to be viewed by a customer. The customer's display (referred to as a customer facing display (CFD)) is mounted in such a way that it can be swiveled left/right for better viewing by the customer opposite or to the side of the operator (who may be, for example, a cashier in a store).

Because the CFD is supported by the same structure that supports the operator's main display, the CFD may be in close proximity to the main display. The close proximity unfortunately results in the CFD contacting the main display as the CFD is swiveled left or right. Such contact limits the angle of rotation of the CFD.

BRIEF DESCRIPTION OF THE DRAWINGS

For a detailed description of exemplary embodiments, reference will now be made to the accompanying drawings in which:

FIG. 1 shows a customer facing display coupled to a main display of a point-of-sale system in accordance with various embodiments;

DETAILED DESCRIPTION

Figure 2A:
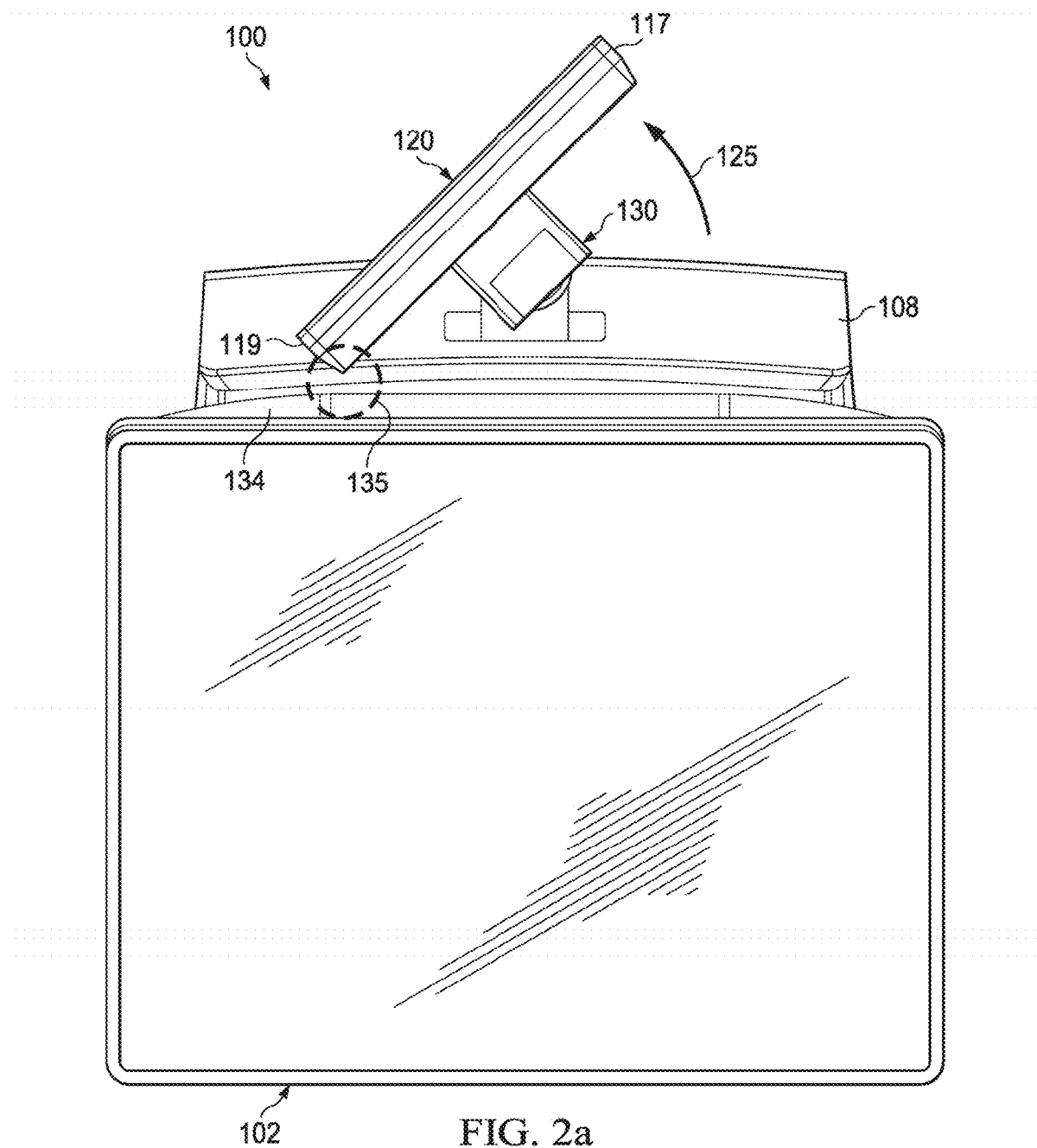
FIGS. 2a and 2b show top views of the point-of-sale system in accordance with various embodiments with the customer facing display rotated between two extremes.

FIG. 1 illustrates a display system 100 in accordance with various embodiments. The display system 100 comprises a main display 102 coupled to and supported by a base 104. A second display 120 is also coupled to the base 104 via a support post 128 and is referred to herein as a "customer facing display." Thus, the display system 100 shown in the example of FIG. 1 comprises two displays, although more than two displays can be provided as desired.

In some embodiments, the display system 100 may comprise a point-of-sale system used by an operator at, for example, a store. The operator views and uses the main display 102 which may be touch sensitive if desired, and a customer views the generally oppositely facing display 120. The use of the display system 100, however, is not limited to purchases at a check-out counter in a store, and the display system 100 can be used other than as a point-of-sale system.

In the embodiment shown in FIG. 1, the customer facing display 120 is smaller than the main display 102. In other embodiments the two displays 102 and 120 may be the same size or the customer facing display 120 may be the larger of the two displays. In general, the customer facing display 120 faces a direction generally opposite from the main display 102 thereby permitting the viewers of the two displays (e.g., the operator and the customer) to stand on opposite sides of the display system 100. Each display 102 and 120 may comprise any suitable type of display such as a liquid crystal display (LCD). Either or both displays 102, 120 may be touch sensitive as well. In some embodiments, neither display is touch sensitive.

The customer facing display 120 comprises a display housing 121 having a front through which a display screen 123 can be viewed, as well as a back (not viewable in FIG. 1). The customer facing display 120 can has at least two degrees of movement. As will be explained below, the display 120 can be slid back and forth (left and right) with respect to its attachment member. The display 120 can also be angularly rotated about the attachment member.

The base 104, which supports both displays 102 and 120, comprises a flat base portion 106 from which extends an angled upper extending portion 108 in the embodiment of FIG. 1. Upper extending portion 108 supports both displays 102 and 120. FIG. 1 shows the main display 102 disposed at an angle with respect to vertical. The main display 102 is shown in FIG. 1 as neither lying flat (in the same plane as the flat base portion 106) nor as completely vertical. In various embodiments, however, the main display 102 can be rotated between flat and vertical orientations to suit the viewing preference of the viewer of display 102. In some embodiments, the main display 102 is capable of rotating about a single axis or multiple axes.

Figure 2B:
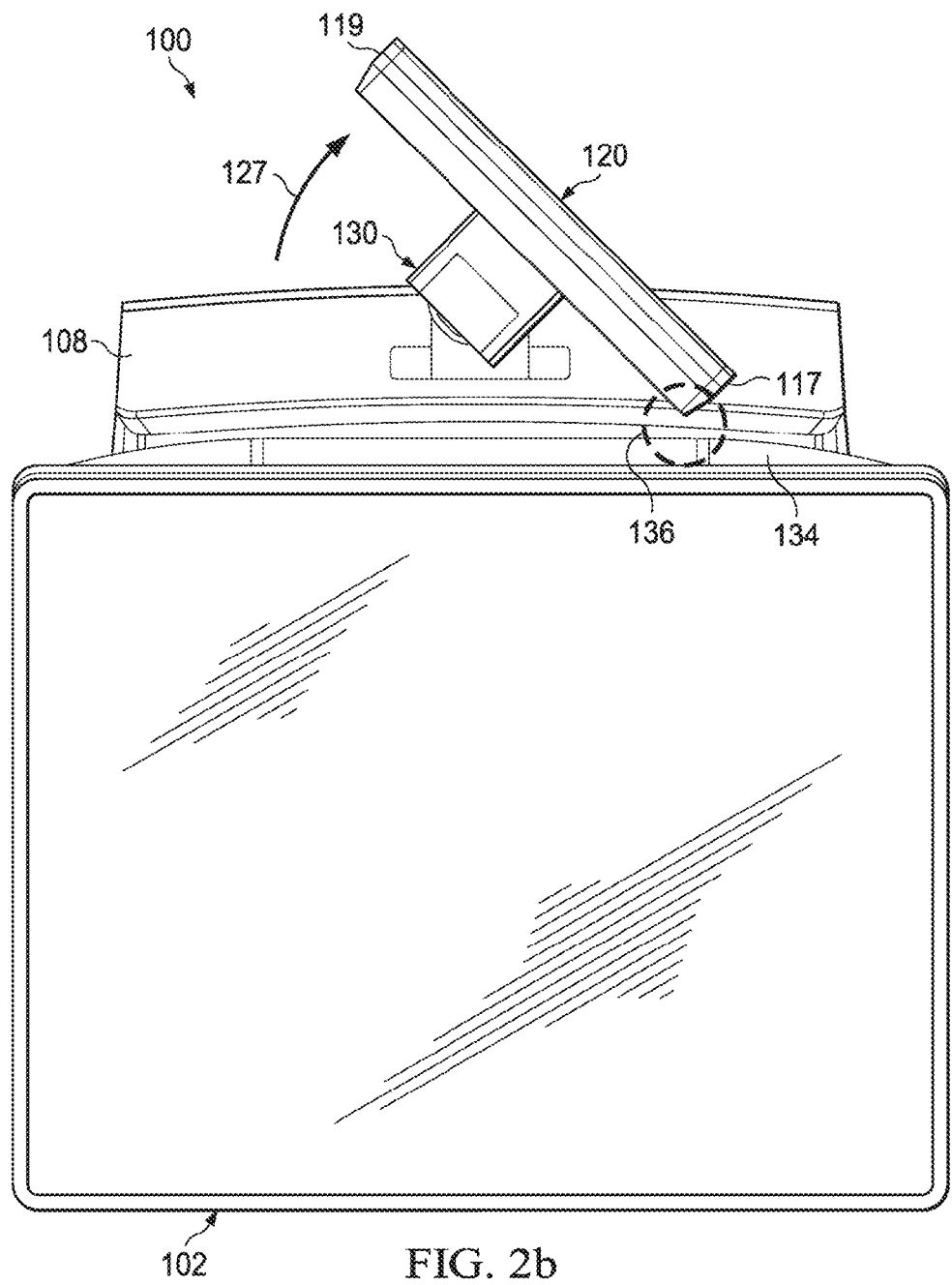

FIGS. 2a and 2b show top views of the display system 100. The main display 102 has been rotated down to a substantially flat, upwardly facing position. In FIG. 2a, the display 120 has been rotated to the left as indicated by arrow 125. The display 120 rotates about an attachment member 130 (which sits atop the support post 128 (FIG. 1)) by way of, for example, the user grabbing opposing sides 117 and 119 and rotating the display about the attachment member 130.

As shown in the example of FIGS. 2a and 2b, the attachment member 130 is attached to the center back of display 120. As the display 120 is rotated to the left as shown in FIG. 2a, the display's edge 119 contacts the angled upper extending portion 108 of the base 104 as indicated by the circled area 135. That contact prevents further rotation of display 102. FIG. 2b illustrates the same issue in the opposite rotational direction (arrow 127) whereby display edge 117 contacts the angled upper extending portion 108 (see circled area 136 in FIG. 2b). The contact that the customer facing display 120 makes with the angled upper extending portion 108 of the base prevents the display 120 from being rotated as fully as may be desired, particularly if, for example, a user of display 120 were to stand at locations 141 and 143 in FIGS. 2a and 2b, respectively.

Figure 3A:
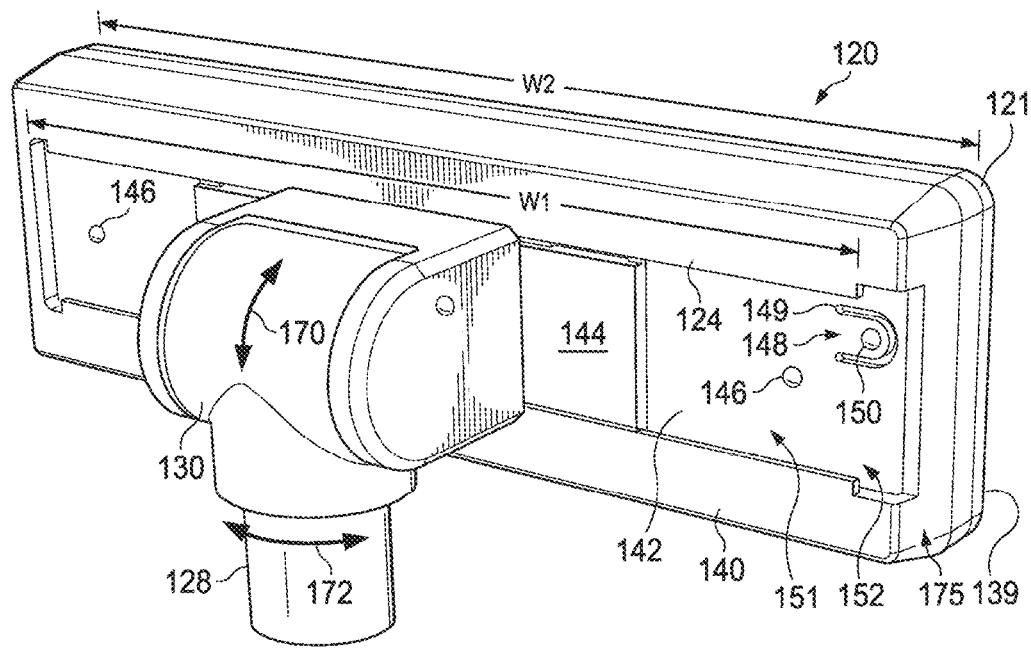
FIGS. 3a-3c illustrate three rear views of the customer facing display slid to three different positions relative to the attachment hinge in accordance with various embodiments.
Figure 3B:
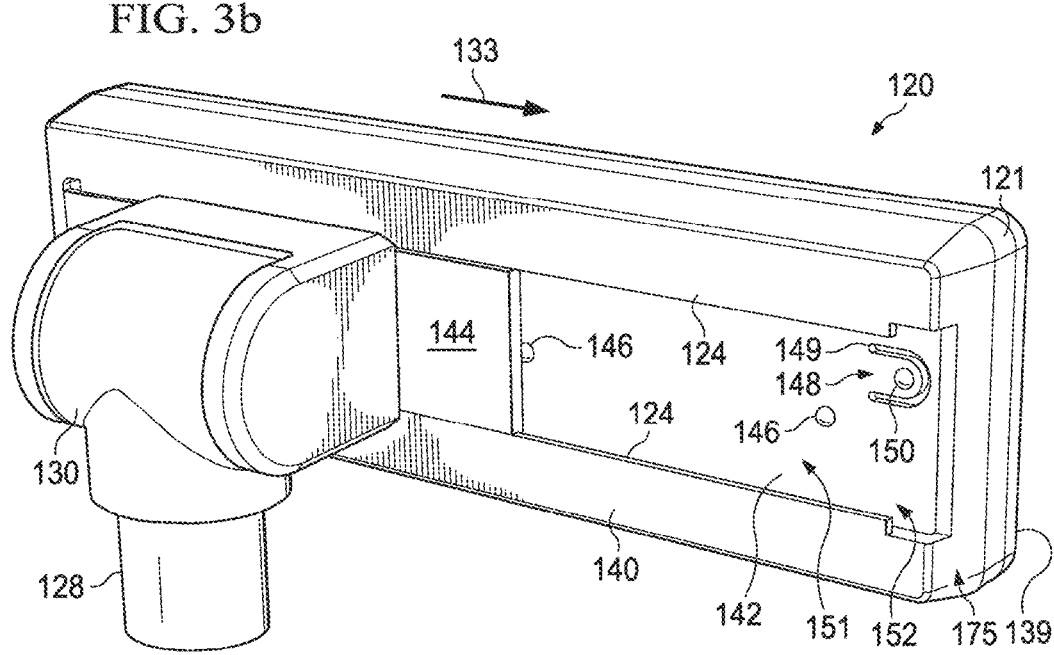
Figure 3C:
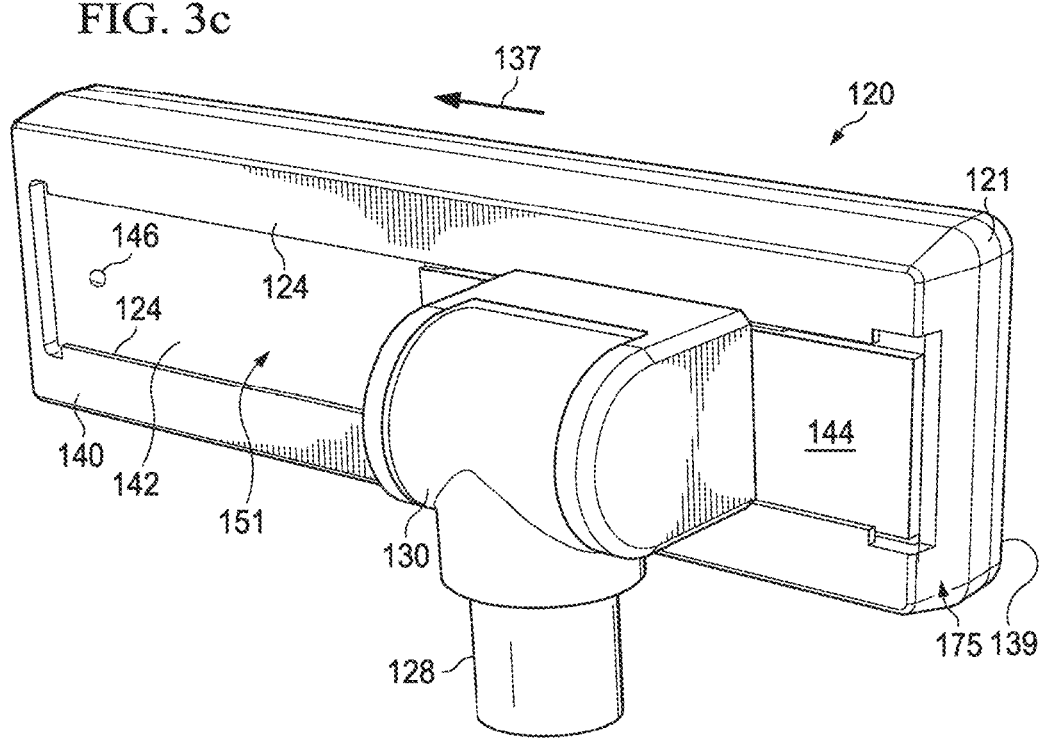

FIGS. 3a-3c show a rear view of the display 120. As can be seen, the display's housing 121 has a front 139 and a back 140. The front 139 and back 140 may comprise two separate portions mated together or the front and back may be opposite sides of one contiguous piece. If separate portions, the front and back may snap fit together or attach together through other mechanisms. Attachment of the back 140 to the front 139 secures a rear cover 142 within the confines of the display housing 121. In at least some embodiments, the front 139, back 140 and rear cover 142 collectively form at least part of the display housing 121 of display 120.

Attachment member 130 in at least some embodiments, comprises a single or multi-axis hinge assembly and, as such, may be also be referred to as an attachment hinge. As such, the attachment member 130 is capable of moving, rotating, or pivoting in one or multiple degrees of freedom. In other embodiments, the attachment member 130 does not permit any rotation of display 120. As an attachment hinge, the attachment member 130 supports the display 120 and permits the display 120 to be rotated in one or more directions as indicated by arrows 170 and 172 (FIG. 3a). Arrow 170 indicates that the display 120 can tilt up and down and arrow 172 indicates that the display 120 can swivel left and right.

Attachment member 130 attaches to, or otherwise includes, a retaining portion, which in some embodiments comprises a plate 144. As shown in FIGS. 3a-3c, plate 144 extends laterally to the left and right from the attachment hinge 130. The plate 144 is not immovably attached to the display 120, and thus the display 120 is able to slide relative to the attachment member 130. The display 120 (or its housing 121) slides relative to all of the attachment member 130. In FIG. 3a, the attachment member 130 is generally centered in the middle of the back 140 of the display 120. In FIG. 3b, the display 120 has been slid in the direction of arrow 133 and in FIG. 3c, the display has been slid in the opposite direction (arrow 137). Thus, the attachment member 130 supports the display 120 at multiple locations along the back of the display 121.

As noted above, the attachment member 130 has two degrees of movement indicated by arrows 170 and 172 in FIG. 3a. With the ability of the display 120 also to slide laterally (left and right) with respect to the attachment member 130, the display 120 is capable of three degrees of movement—lateral translation (indicated by arrow 133), tilting (indicated by arrow 170), and rotation (indicated by arrow 172)

That portion of the rear cover 142 that is exposed through back 140 of the display 120 represents the portion across which the attachment member 130 and plate 144 can travel. The combination of the rear cover 142 of the housing 121 and a pair of overhanging lips 124 define a cavity 151 in which the plate 144 of the attachment member 130 is retained thereby permitting the display 120 to slide back and forth. The width W1 of the cavity 151 extends at least 50% of the width W2 of the display housing 121 (i.e., W1 is at least half as long as W2). In other embodiments, the width W1 of cavity 151 extends at least 80% of the width W2 of the display housing 121 (i.e., W1 is at least 80% of W2). And in yet other embodiments W1 is at least 90% of W2.

In some embodiments, at least one side 175 of display housing 121 comprises a slot 152 through which the plate 144 of the attachment member 130 can be inserted into cavity 151 during assembly of the display 121 and attachment member 130. At least one biasing member 148 is provided at or near end 175. In some embodiments, the biasing member 148 may comprise a peninsula of the rear cover 142 after removal of a portion of the rear cover 142 as indicated by 149. The material removed from the rear cover 142 may comprise a C-shaped portion of material and may be removed by formed by molding. A protruding portion 150 is added to, or otherwise formed, at or near the tip of the biasing member 148.

Figure 3D:
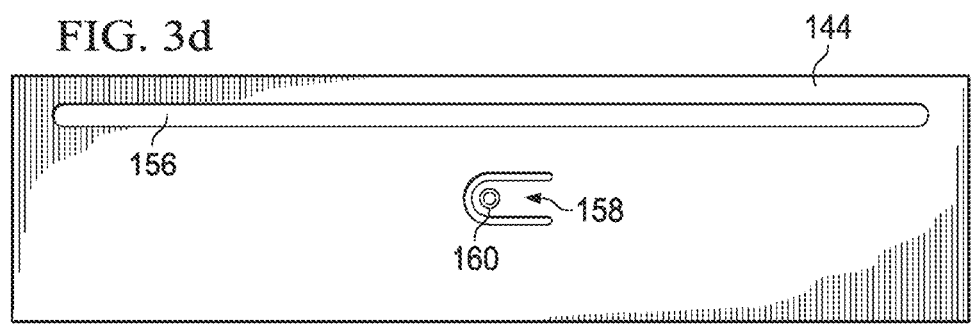
FIG. 3d illustrates a retaining portion of an attachment hinge of the display system in accordance with various embodiments.

To insert one end of plate 144 into slot 152, a user presses inward on the protruding portion 150 (toward the front 139 of the display 120), thereby forcing the biasing member 148 to be deflected inward (i.e., toward front 139 of display 120) slightly from its original position. The user then slides the plate 144 into the slot 152. FIG. 3d illustrates the surface of the plate 144 adjacent the rear cover 142. As can be seen, the plate 144 comprises a groove 156 formed therein to receive the protruding portion 150 from biasing member 148. The groove 156 may or may not be cut all of the way through the rear cover 142. The biasing member 148 springs back to its original position once the bump 150 is permitted to enter the groove. The display 120 can then be slid back and forth in cavity 151, and during normal usage does not come off the attachment member 130 because the protruding portion 150 is retained in the groove 156 and thus prevents the display 120 from easily being pulled off the attachment member 130.

FIG. 3d also shows another biasing member 158 formed in the side of the attachment hinge plate 144 facing rear cover 142. Biasing member 158 may be formed in plate 144 in much the same way as biasing member 148 (e.g., a peninsula formed by removal of material in a C-shaped area 160). A protruding portion 158 is also provided at or near the tip of the biasing member 148. In the embodiment of FIGS. 3a-3d, three indentations 146 are formed in the rear cover 142 to receive the protruding portion 158 as the display 120 is slid back and forth. The spacing and location of the indentations 146 are arranged so that the protruding portion 158 is received into the indentations 146 at three locations of travel of the display corresponding to the left, right and center stop positions as shown in FIGS. 3a-c. The indentations 146 may be formed all of the way through, or partially through, the rear cover 142. A number of indentations other than three can be provided as well depending on, for example, the number of stop positions desired for display 120.

Figure 4A:
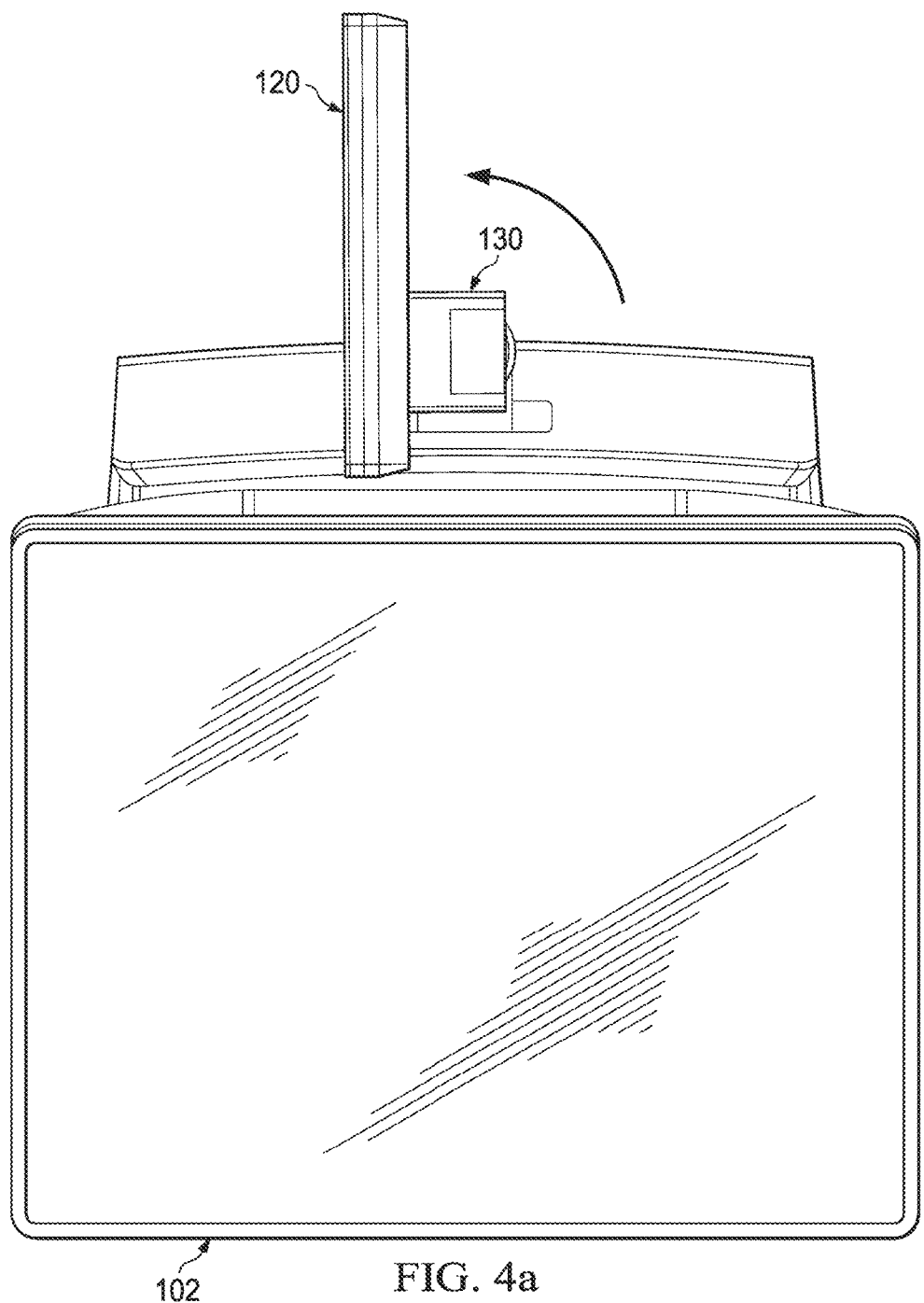
FIGS. 4a and 4b show two top views of the point-of-sale system with the customer facing display rotated between two positions in accordance with various embodiments in which the customer facing display is slid along the attachment hinge.
Figure 4B:
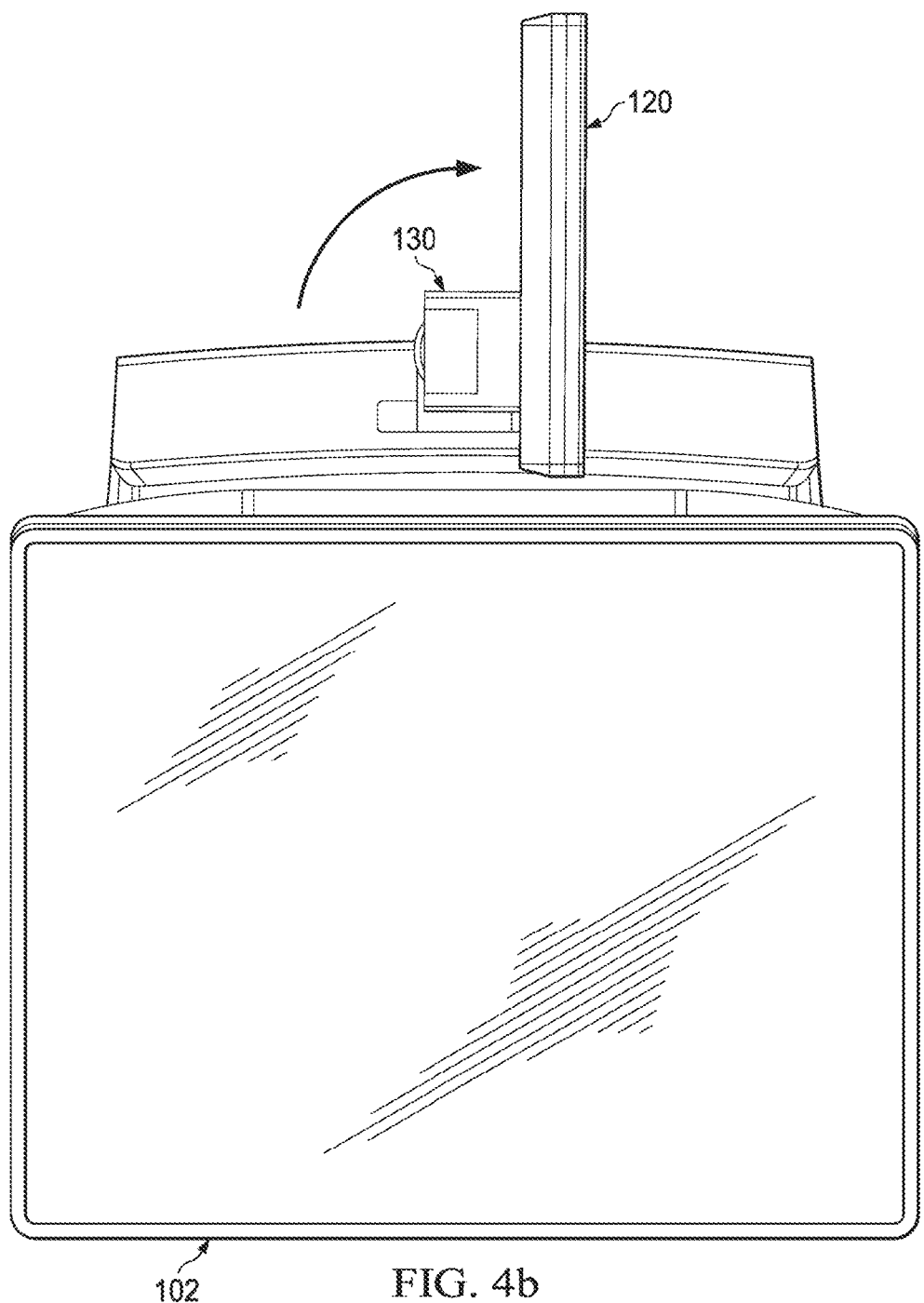

FIGS. 4a and 4b illustrate that, with the ability of the display 120 to slide back and forth on the attachment member 130, the display 120 can be rotated outward in either direction to a greater degree than was possible in FIGS. 2a and 2b when the attachment member 130 was only at the middle of the back of the display 120. FIG. 4a shows a top view of the system 100 with the display 120 swung to the left and FIG. 4b shows the display swung to the right. As shown, the display 120 can be rotated outwardly enough so as to permit the display to be rotated to opposing positions substantially 180 degrees apart as shown in FIGS. 4a and 4b.

Figure 5:
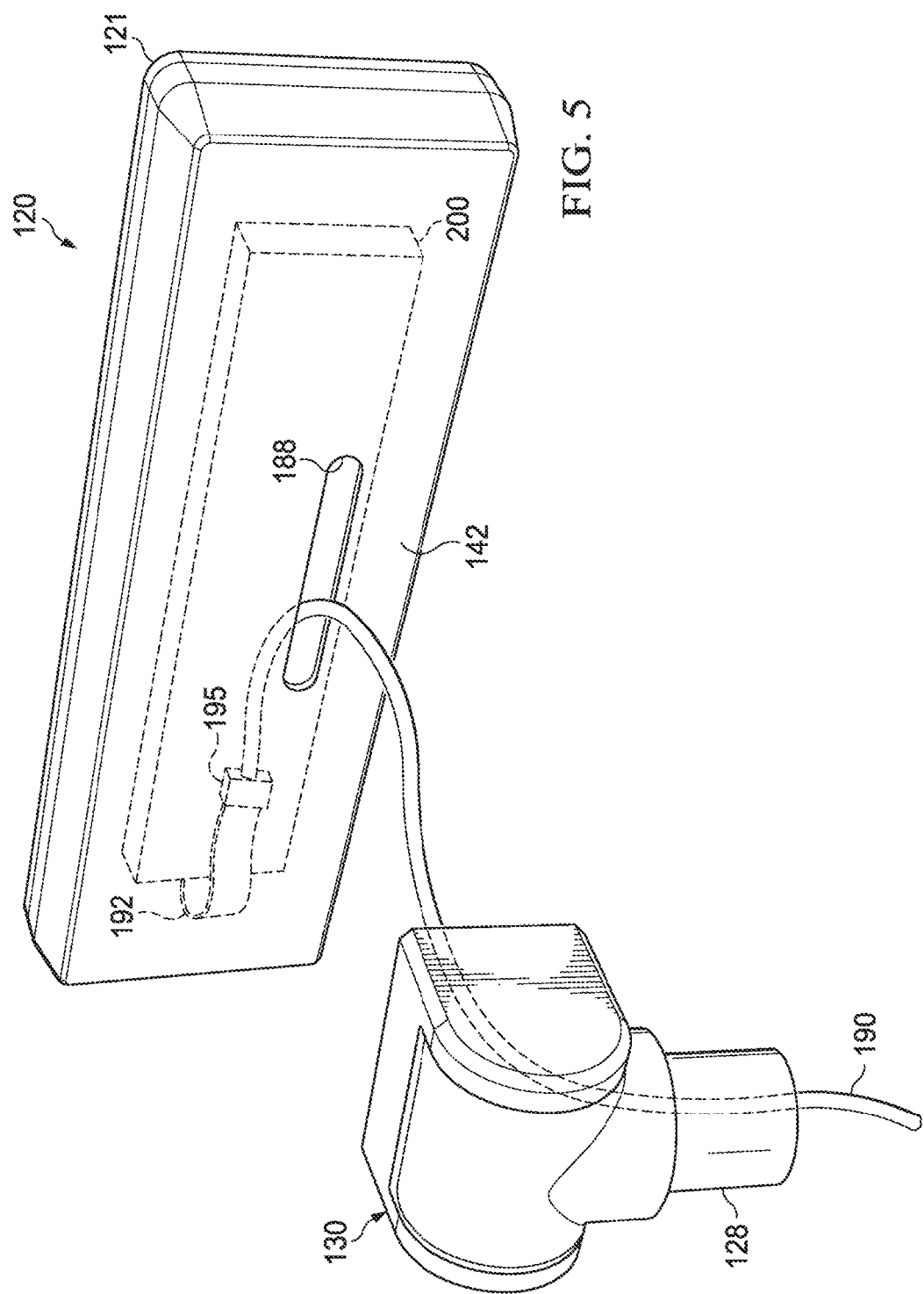
FIG. 5 shows an exploded view of the customer facing display and an attachment hinge in accordance with various embodiments.

FIG. 5 shows an exploded separating display 120 from attachment member 130. Electrical (power and/or data) connections may be provided via a cable 190 that extends through post 128 and attachment member 130 and through a slot 188 formed in the rear cover 142 of the display 120. In the interior of the display housing 121, the power and/or data connections are provided by a ribbon cable 192 which connects to cable 190 by connector 195. The ribbon cable 192 attaches to a display module 200 inside the display housing 121. The display module 200 operates the display screen 123 (FIG. 1). The ribbon cable 192 is of a sufficient length inside the display housing 121 and has enough flexibility to permit the display 120 to slide back and forth on the attachment member 130 as described above without becoming caught or breaking or otherwise interfering with the smooth sliding motion of the display.

FIGS. 6a-6d illustrate an alternative embodiment to that of FIGS. 3a-3d. The embodiment of FIGS. 6a-6d is similar to that of FIGS. 3a-3d in many respects but differs in other regards as explained below.

FIGS. 6a-6d illustrate that the display housing (designated as 221) does not include any open ends as was the case in FIGS. 3a-3c. Further, the back 240 of the display housing comprises multiple tabs 224 on both the top and bottom sides of the back. In the embodiment shown, the top side has two tabs 224 as does the bottom side. A cavity 251 is defined by the tabs 224 and the rear a cover 242. The attachment member (designated as 230) also includes two tabs 249 on the top and bottom sides of its retaining portion (e.g., plate 244). The spacing and arrangement of the tabs 224 and 249 are configured so that the display housing 221 can be mated to the attachment member 230 and plate 244 at only one location along cavity 251. In some embodiments, that single attachment location is near, but not at, the middle of the back 240 of the display housing 221. In one example, the attachment location is about 9.25 mm (+/−0.5 mm) from the middle of the back 240 of the display housing 221.

Figure 6A:
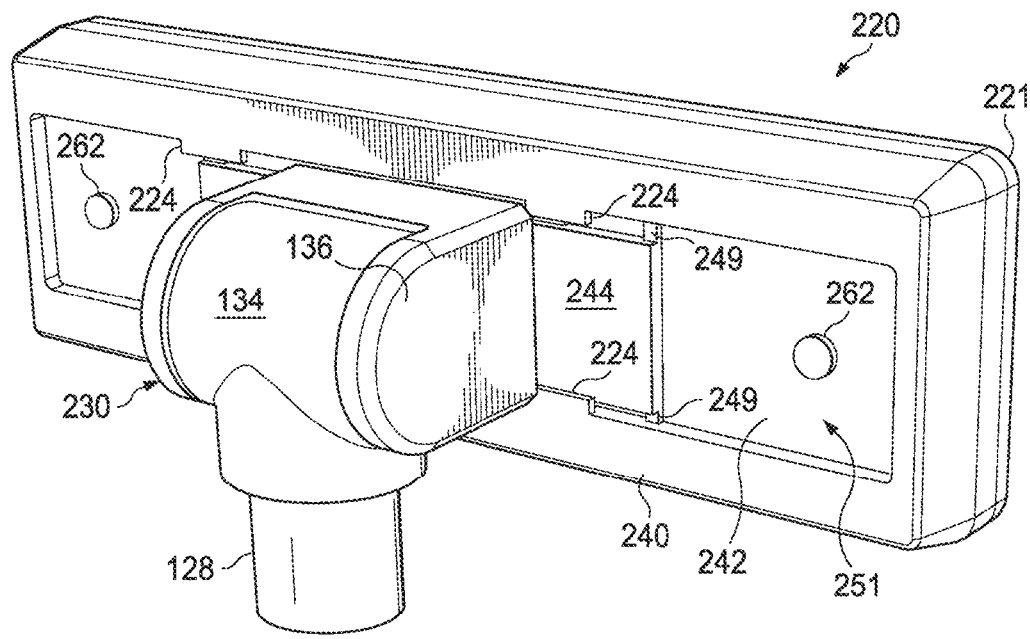
FIGS. 6a-6c illustrate three rear views of another embodiment of the customer facing display slid to three different positions relative to the attachment hinge.
Figure 6B:
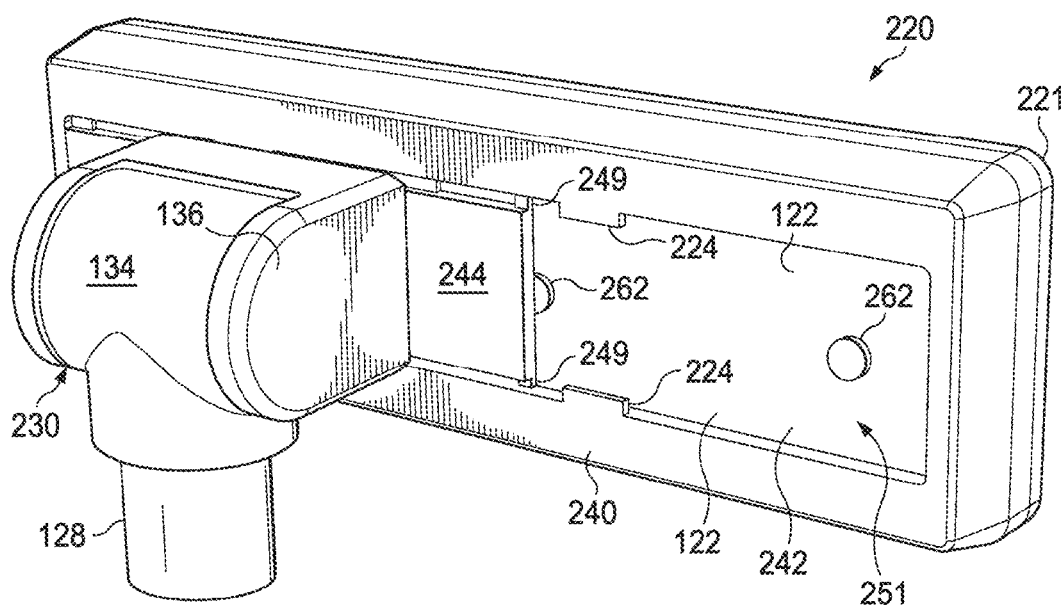
Figure 6C:
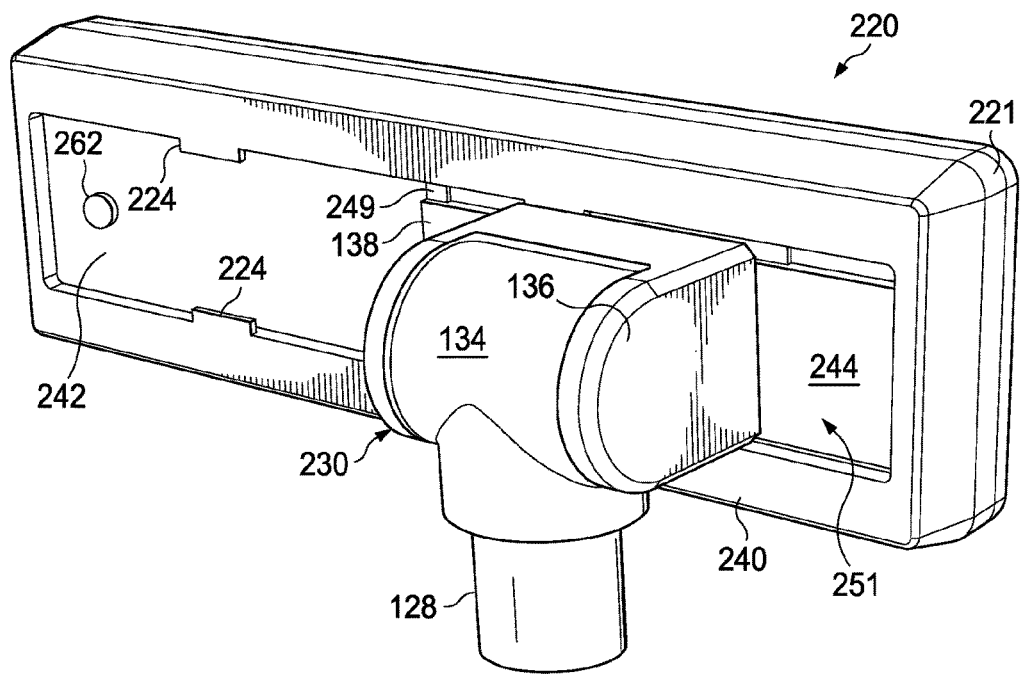
Figure 6D:
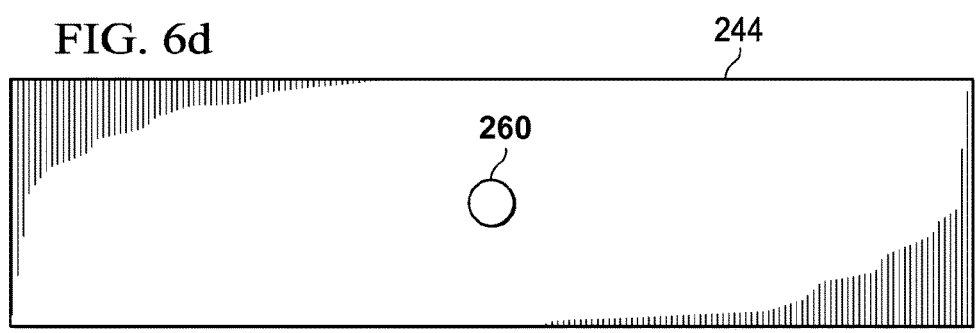
FIG. 6d illustrates another embodiment of a retaining portion of an attachment hinge of the display system.

FIG. 6d shows the surface of the attachment member's plate 244 adjacent rear cover (designated as 240). The plate 244 includes a magnet 260 attached thereto. The rear cover 240 also includes one or more magnets 262 positioned along its width. Magnets 260 and 262 have north and south poles and are placed on the plate 244 and rear cover 242 in such way that the opposite poles face each other when the display 220 is positioned on the attachment member 230 and plate 244. The attraction created by the opposite poles causes the display 220 to be biased toward one of the three possible locations—center, left, and right—similar to that described above with regard to FIGS. 3a-3c. The magnets are strong enough to generally maintain the display 220 in one of the three selected positions but weak enough to enable a user to fairly easily slide the display 220 back and forth to select a desired position.

Figure 7:
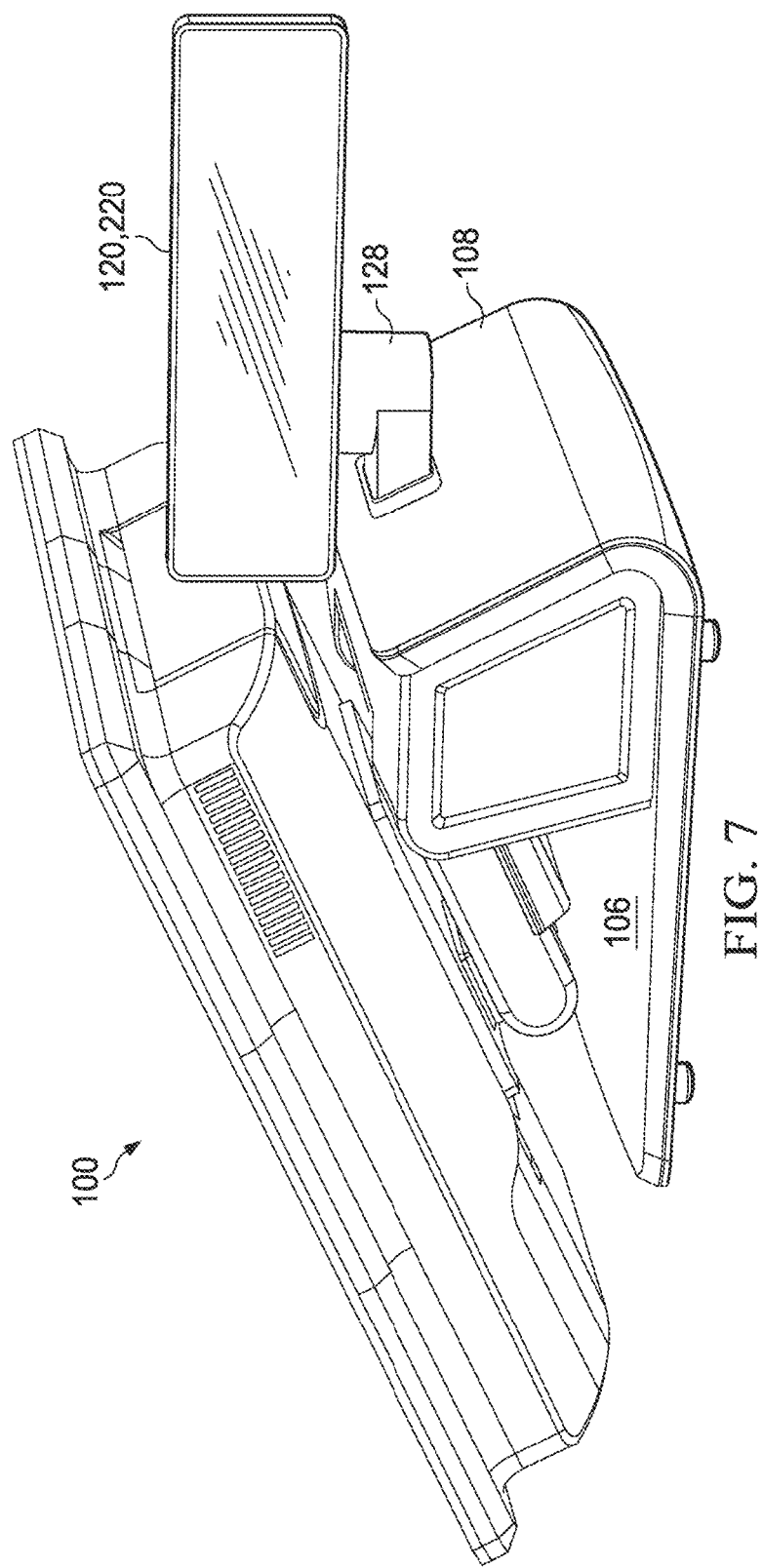
FIG. 7 shows a side view of the point-of-sale system with the customer facing display slid to one side in accordance with various embodiments to permit a greater degree of rotation.

FIG. 7 shows a side view of the display system 100 with the display 120 slid to one end of the attachment hinge 130, 230 and post 128 and rotated outward to the side.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A display system, comprising:
    a base;
    a support post attached to the base;
    a display comprising a display housing; and
    an attachment member that supports the display housing, the attachment member rotatably attached to the support post, the attachment member rotatable with respect to the support post along a first rotational direction in a first plane to swivel the display housing along the first rotational direction,
    wherein the attachment member is further rotatably attached to a support member separate from the support post, such that the display housing is tiltable relative to the support post along a second rotational direction in a second plane perpendicular to the first plane, and
    wherein the support member is slideable along a horizontal width of the display housing so that the attachment member is slideable relative to the display housing along the horizontal width of the display housing.

2. The display system of claim 1 wherein the display housing comprises a cavity that extends along the horizontal width of the display housing, and the support member is slideably attached to the display housing in the cavity.

3. The display system of claim 2 wherein the display housing comprises at least one overhanging lip that retains a retaining portion of a plate of the support member within the cavity.

4. The display system of claim 1 wherein the support member comprises a biasing portion having a protrusion, the protrusion mating with each of a plurality of indentations on the display housing as the display housing slides relative to the attachment member, and wherein the biasing portion deflects as the protrusion moves between the indentations.

5. The display system of claim 1 wherein the support member comprises a plate that mates to the display housing, and wherein the display housing is slideable relative to the plate.

6. The display system of claim 1 wherein the display housing has an end portion that includes a slot into which a retaining portion of the support member is inserted to mate the display housing to the attachment member.

7. The display system of claim 6 wherein the display housing has a biasing member and a protrusion, the protrusion received in a groove on the retaining portion.

8. The display system of claim 1 wherein the support member comprises a magnet and the display housing comprises a magnet.

9. The display system of claim 1 wherein the attachment member comprises a hinge.

10. A point-of-sale system, comprising:
    a base;
    a first display supported by the base;
    a support post attached to the base;
    a second display comprising a display housing;
    an attachment hinge that supports the display housing, the attachment hinge rotatably attached to the support post, the attachment hinge rotatable with respect to the support post along a first rotational direction in a first plane to swivel the display housing along the first rotational direction,
    wherein the attachment hinge is further rotatably attached to a support member separate from the support post, such that the display housing is tiltable relative to the support post along a second rotational direction in a second plane perpendicular to the first plane, wherein the display housing has a back comprising a cavity, and
    wherein the support member is slideable along the cavity along a horizontal width of the display housing so that the attachment hinge is slideable relative to the display housing.

11. The point-of-sale system of claim 10 wherein the support member comprises a biasing portion having a protrusion, the protrusion inserted into a plurality of indentations on the display housing as the display housing is slid relative to the attachment hinge, and wherein the biasing portion deflects as the protrusion moves between the indentations.

12. The point-of-sale system of claim 10 wherein the display housing has an end portion that includes a slot into which a plate of the support member is inserted to mate the display housing to the support member.

13. The display system of claim 1, wherein the attachment member is slideable along the horizontal width in a cavity of the display housing, the cavity extending in a lateral direction along the horizontal width, the lateral direction perpendicular to a length of the support post.

14. The display system of claim 1, wherein the display is a first display, the display system comprising:
a second display separate from the first display, the second display supported by the base.

15. The display system of claim 14, wherein the first display faces a first direction, and the second display faces a second direction opposite the first direction.

16. The point-of-sale system of claim 10, wherein the first display faces a first direction, and the second display faces a second direction that is opposite the first direction.

17. A method of providing a display system, comprising:
attaching a support post to a base;
attaching a display housing of a display to a support member;
rotatably attaching an attachment member to the support post, the attachment member supporting the display housing and rotatable with respect to the support post along a first rotational direction in a first plane to swivel the display housing along the first rotational direction;
rotatably attaching the attachment member to the support member so that the display housing is tiltable relative to the support post along a second rotational direction in a second plane that is perpendicular to the first plane; and
slideably attaching the support member to the display housing so that the attachment member is slideable relative to the display housing along a lateral direction along a horizontal width of the display housing.

18. The method of claim 17, wherein the support member is slideable in the lateral direction along a cavity of the display housing, the cavity extending in the lateral direction, the lateral direction perpendicular to a length in a vertical direction of the support post.

19. The display system of claim 1, wherein the horizontal width of the display housing is along a direction that is perpendicular to a length in a vertical direction of the support post.

20. The point-of-sale system of claim 10, wherein the horizontal width of the display housing is along a direction that is perpendicular to a length in a vertical direction of the support post.

* * * * *